United States Patent Office 3,052,519
Patented Sept. 4, 1962

3,052,519
PROCESS OF PREPARING PURE SODIUM HYPOPHOSPHITE
Valerio Bianchi and Bruno Pescarolo, Milan, Italy, assignors to Montecatini Società Generale per l'Industria Mineraria e Chimica, Milan, Italy, a corporation of Italy
No Drawing. Filed Jan. 14, 1958, Ser. No. 708,747
Claims priority, application Italy Jan. 18, 1957
7 Claims. (Cl. 23—107)

This invention relates to a process of preparing pure sodium hypophosphite in form of a solution or powder.

Hypophosphites are salts of the hypophosphorus acid, $H_3PO_2$, having the general formula $$MH_2PO_2$$

The most important hypophosphite is the sodium salt, $NaH_2PO_2$, which, generally, is used in pharmaceutical preparations but recently has also found wide use in chemical nickel plating.

Sodium hypophosphite is presently obtained by treating soluble calcium hypophosphite with sodium carbonate; the calcium hypophosphite having been prepared by heat treating white phosphorus with an excess of calcium hydroxide.

The reactions involved are as follows:

$$3Ca(OH)_2 + 8P + 6H_2O \rightarrow 3Ca(HPO_2)_2 + 2PH_3 \quad (1)$$

$$Ca(HPO_2)_2 + Na_2CO_3 \rightarrow 2NaH_2PO_2 + CaCO_3 \quad (2)$$

During the reaction between phosphorus and calcium hydroxide, secondary products, such as calcium phosphite and phosphate are also formed. They are insoluble and remain with the excess of calcium hydroxide when the turbid liquid is filtered.

Because of the formation of these secondary reactions, recourse must be had to the intermediate calcium salts. In fact, the direct reaction between phosphorus and an alkali hydroxide or carbonate $$3NaOH + 4P + 3H_2O \rightarrow 3NaH_2PO_2 + PH_3 \quad (3)$$

appears theoretically more advantageous but leads to the simultaneous formation of soluble secondary products which lower the yield of sodium hypophosphite thus obtained. Moreover, excess alkalinity must be used in order to keep the yield and the reaction time within reasonable limits. Consequently, the hypophosphite obtained is also strongly alkaline.

As Reaction 1 shows, only 6 mols or 75% of the phosphorus introduced is converted into hypophosphite.

It has however been established that the reaction yield is to be calculated only on the phosphorus convertible into hypophosphite and not on total phosphorus.

A number of workers in the field, predominantly Germans and Russians, have developed and patented various processes for obtaining calcium hypophosphite by introducing changes into the procedure utilizing the reactivity between phosphorus and calcium hydroxide.

For example, according to Russian Patent No. 53,855 (1938), an amount of lime about 5 times higher than the stoichiometric amount is used and small amounts of dichloroethane are employed to keep the reaction system free of oxygen while operating at about 80–85° C.

The German authors, H. Böhme and C. I. Rojan, employ higher amounts of lime (up to 9 times the stoichiometric amount) while operating at boiling temperature and removing, by means of steam, the oxygen present in the reaction vessel.

Highest yields of 60%, calculated as mentioned hereinabove, are disclosed.

A lime excess is necessary to better disperse the molten phosphorus and to decrease the reaction time. It is noteworthy, however, that the reaction time of about 12–15 hours is still excessively long.

It is the principal object of the present invention to provide a simple and economical process for obtaining sodium hypophosphite with high yields and at reduced reaction times.

It is another object of our invention to obtain sodium hypophosphite in form of a solution or powder, of such a high degree of purity that it can be profitably used in chemical nickel plating.

The process, which is an object of the present invention, is characterized by the following aspects:

(a) In addition to the lime, the amount of sodium carbonate needed for the formation of sodium hypophosphite is introduced in one reaction step, (b) As against prior processes, the amount of lime is reduced, (c) The reaction mixture is suitably agitated.

In other words, white phosphorus is reacted with a reduced amount of lime, sufficient to fix the secondary reaction products, such as insoluble calcium salts, but at the same time with the amount of sodium carbonate needed for the formation of sodium hypophosphite. Thus, the basic reaction step and the double exchange step occur simultaneously in one and the same vessel and, after filtration, a pure sodium hypophosphite solution is directly obtained. Adequate dispersion of molten phosphorus in the reaction mass is assured by suitable stirring.

More particularly, we have obtained greatly increased yield of highly pure sodium hypophosphite by employing 85–90% of the sodium carbonate amount calculated on the basis of Reaction 2 and an amount of lime milk corresponding to twice the stoichiometric amount calculated from Reaction 1.

The following principal reactions occur in the herein-claimed process which is an object of the present invention:

(1)    $Ca(OH)_2 + Na_2CO_3 \rightarrow CaCO_3 + 2NaOH$ (2)    $3NaOH + 4P + 3H_2O \rightarrow 3NaH_2PO_2 + PH_3$ In the course of said reactions, sodium carbonate is thus transformed into caustic soda which reacts in turn with phosphorus to directly produce sodium hypophosphite.

This process was found to comprise the following advantages:

(1) Because of the higher basicity and solubility of caustic soda, the yield is increased from 60% to 80–85%, (2) For the same reasons the reaction time is reduced to 5–7 hours, (3) The operating cycle is substantially simplified and, as previously stated, the reaction and inversion steps occur simultaneously in the same vessel, (4) More highly concentrated sodium hypophosphite solutions are obtained, (5) Less equipment and lower amounts of lime and power are required.

A preferred manner of carrying out the invention is as follows:

Into a reactor provided with a suitable stirrer, an inlet tube, a tube for introducing nitrogen and a reflux condenser, lime, water and sodium carbonate are introduced, and then molten or granulated phosphorus is gradually added.

At the same time, the reactor is kept under low nitrogen pressure. During the first hours the temperature is kept at about 80° C. and is then raised to about 100° C.

Upon completion of the reaction, indicated by the cessation in development of phosphine, the reaction mixture is filtered under suction and the filter cake, consisting of non-reacted lime and insoluble calcium phosphite and phosphate, is washed with a small amount of water.

The filtered solution is concentrated to about one fourth of its volume, saturated with $CO_2$ and filtered. A very pure, concentrated sodium hypophosphite solution is obtained which may be used as such or reduced to dryness.

The present invention is further illustrated by the following example, without intent, however, to limit it thereto:

*Example*

145 g. of calcium hydroxide are suspended in 1000 cc. of water. 96 g. of sodium carbonate, in form of an aqueous solution of 3000 g./l., are added. This suspension is reacted for about 10 minutes while stirring, whereupon 80 g. of granulated phosphorus are added.

The temperature is gradually raised to 70–80° C. within a period of 2 hours and maintained at this level for about another 2 hours. During this time almost all the phosphine has formed. The temperature is then raised to and kept at 100° C. for still another 2 hours, followed by cooling to about 30° C. and vacuum filtration. The filter cake, consisting of lime and insoluble calcium phosphates, is thoroughly washed with water.

2,390 cc. of filtered solution (including 800 cc. of the washing) are obtained, containing 47.8 g./l. $P_2O_5$.

The dried filter cake weighs 204 g. and contains 14.95% $P_2O_5$. The filtered solution (including the washing) is concentrated under vacuum to a volume of about 350 cc. and is then saturated with $CO_2$ in order to precipitate, as calcium carbonate, the lime still present in the solution. The precipitate is then filtered off.

340 g. sodium hypophosphite solution, having the following composition, are obtained:

| | |
|---|---|
| Total $P_2O_5$ | 336.0 g./l. |
| equivalent to | |
| $NaH_2PO_2$ | 416.2 g./l. |
| Ca | Absent. |
| Free alkalinity (as NaOH) | 5.01%. |
| Total yield | 83.2%. |

We claim:

1. A process for preparing sodium hypophosphite, comprising treating an aqueous mixture of calcium hydroxide and sodium carbonate with free phosphorus, the reaction mixture being heated at a temperature between about 70° and 100° C. for a plurality of hours to form an aqueous solution of sodium hypophosphite.

2. A process of preparing sodium hypophosphite, comprising reacting sodium carbonate and calcium hydroxide in water, to produce an aqueous mixture of sodium hydroxide and calcium carbonate, and treating the aqueous mixture with free phosphorus to react with the sodium hydroxide, the said treating with phosphorus being carried out at a temperature between 70° and 100° C. for a plurality of hours to form an aqueous solution of sodium hypophosphite.

3. A process of preparing sodium hypophosphite according to the following reaction schemes:

$$Ca(OH)_2 + Na_2CO_3 \rightarrow CaCO_3 + 2NaOH$$
$$3NaOH + 4P + 3H_2O \rightarrow 3NaH_2PO_2 + PH_3$$

said process comprising reacting sodium carbonate and calcium hydroxide in water to produce an aqueous mixture of sodium hydroxide and calcium carbonate, and treating the said aqueous mixture with free phosphorus to react with the sodium hydroxide, at least 0.35 mol calcium hydroxide and at least 0.3 mol sodium hydroxide being reacted per phosphorus atom, the reaction with phosphorus being in an inert gas atmosphere.

4. A process for preparing sodium hypophosphite, comprising introducing free phosphorus into an aqueous suspension of calcium hydroxide and sodium carbonate, and heating the reaction mixture at between about 70° to 100° C. for a plurality of hours, in an inert gas atmosphere, while stirring, to form an aqueous solution of sodium hypophosphite.

5. A process for preparing sodium hypophosphite, comprising introducing free phosphorus into an aqueous suspension of calcium hydroxide and sodium carbonate, the reaction mixture being heated at between about 70° and 100° C. for a plurality of hours, in an inert gas atmosphere, while stirring, sodium hydroxide being formed in said aqueous suspension, at least 0.35 mol calcium hydroxide and at least 0.3 mol sodium hydroxide per phosphorus atom being reacted.

6. A process of preparing sodium hypophosphite according to the following reaction schemes:

$$Ca(OH)_2 + Na_2CO_3 \rightarrow CaCO_3 + 2NaOH$$
$$3NaOH + 4P + 3H_2O \rightarrow 3NaH_2PO_2 + PH_3$$

said process comprising reacting sodium carbonate and calcium hydroxide in water to produce an aqueous mixture of sodium hydroxide and calcium carbonate, and treating the said aqueous mixture with free phosphorus to react with the sodium hydroxide, at least 0.35 mol calcium hydroxide and at least 0.3 mol sodium hydroxide being reacted per phosphorus atom, the reaction with phosphorus being in an inert gas atmosphere, the reaction mixture being heated at between about 70° to 100° C. for a plurality of hours.

7. The process of claim 2, the phosphorus being white phosphorus.

References Cited in the file of this patent

UNITED STATES PATENTS

| 2,595,198 | Lefforge et al. | Apr. 29, 1952 |
| 2,595,199 | Lefforge et al. | Apr. 29, 1952 |

OTHER REFERENCES

Van Wazer: "Phosphorus and Its Compounds," Interscience Publishers, N.Y., 1958, pages 355–359.

Mellor: "Comprehensive Treatise on Inorganic and Theoretical Chemistry," vol. 8, 1928, pages 881–887.